Figures 1, 2, 3:
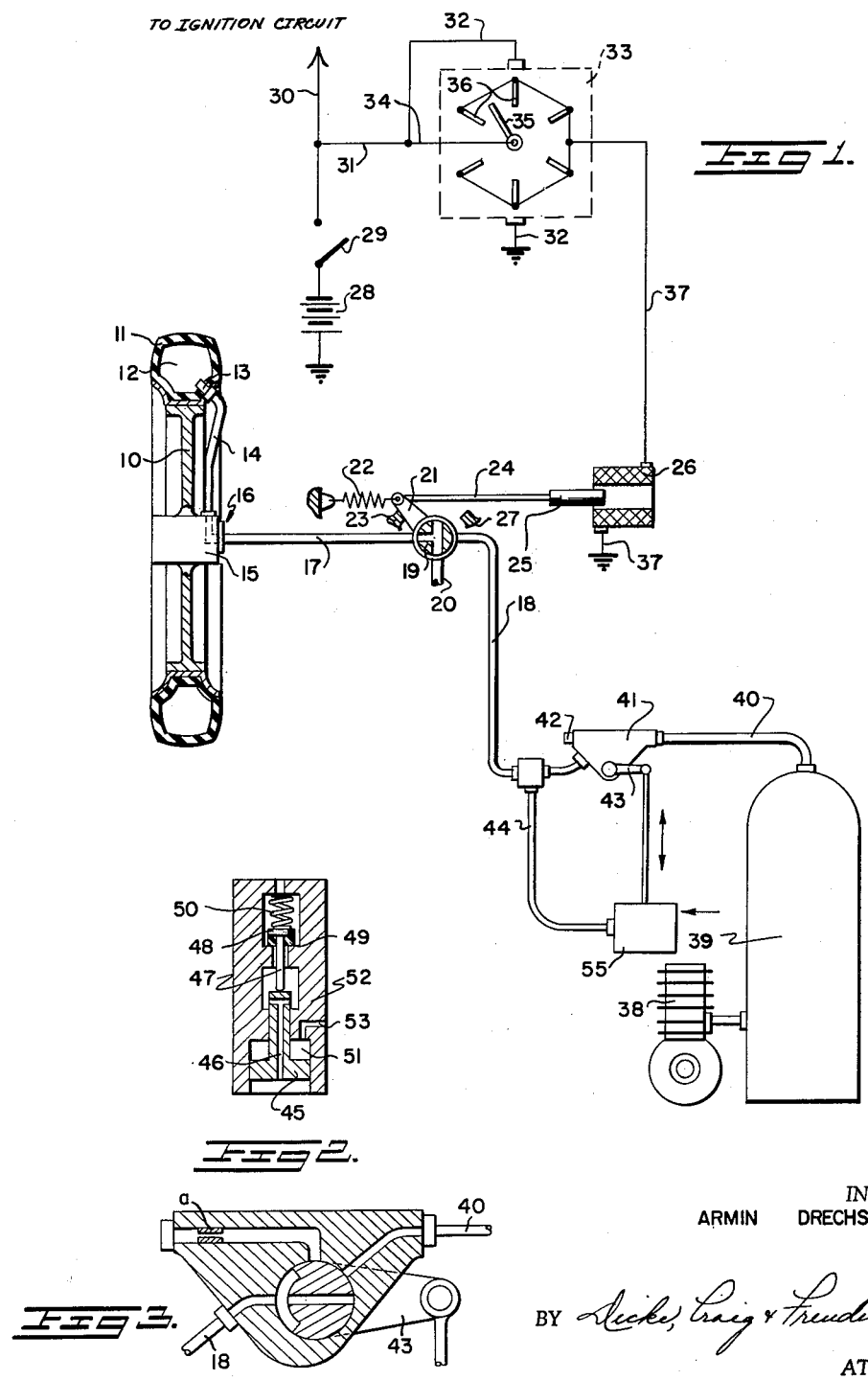

Aug. 20, 1963 A. DRECHSEL 3,101,111
TIRE PRESSURE CONTROL DEVICE
Filed Jan. 3, 1961

INVENTOR
ARMIN DRECHSEL

BY Dicke, Craig & Freudenberg
ATTORNEYS

3,101,111
TIRE PRESSURE CONTROL DEVICE

Armin Drechsel, Stuttgart, Germany, assignor to Daimler-Benz Aktiengesellschaft, Stuttgart-Unterturkheim, Germany
Filed Jan. 3, 1961, Ser. No. 80,451
Claims priority, application Germany Jan. 5, 1960
10 Claims. (Cl. 152—416)

The present invention relates to a tire pressure regulating system for vehicles, especially motor vehicles in which a timing mechanism operatively connects the inside of the tires of the vehicle at predetermined timed intervals with a control means so as to supply air to or release air from the tire insides to thereby maintain a predetermined tire pressure within the tire, such connection being established through an automatic check valve of a construction particularly suited for that purpose and arranged within the tire.

It is known in the prior art to provide in motor vehicles supported on pneumatic tires a connection between the tire inside and a non-rotating pressurized-air storage tank or pressurized air producer arranged at the vehicle body in order to manually subject to pressure, as required, with the aid of a control member the normally vented connection line, the tire pressure being maintained during the venting operation through a check valve, and to exert in this manner an influence on the tire pressure.

In contradistinction to such prior art systems, it is proposed in accordance with the present invention to provide an automatic actuating mechanism for the control member which places the control member periodically, for relatively short periods of time, into the position thereof in which a communication is established with the air-pressure tank or air-pressure producer whereas, during the remainder of the time, it is left in the venting or relieving position. By the use of an arrangement in accordance with the present invention, the driver is freed of the additional manual actuating duty required in the prior art installations, and additionally there is also provided the assurance that the tire pressure control is carried out regularly without leaving the connecting line with the sealing places thereof, especially with the sealing place between the stationary and the rotating part, constantly under pressure and thereby causing leakage losses.

The control installation according to the present invention may operate with the aid of a timing mechanism, preferably of an electric timer of any known construction which has to operate only during the operation of the vehicle so that the energizing circuit for the electric timing mechanism is appropriately connected through the ignition switch of the motor vehicle. However, it is also possible within the scope of the present invention to control the timing control mechanism so as to operate in dependence on the distance traversed by the vehicle, i.e., to move the control member each time after a certain number of rotations of the wheels.

The tire pressure control system according to the present invention may be installed advantageously in that case in which a predetermined tire pressure is to be maintained at all times and only leakage losses are to be compensated. The tire pressure control installation according to the present invention is particularly appropriate with installations in which the value of the tire pressure is automatically controlled, for example, in dependence on the vehicle load and/or vehicle velocity among which should also be counted installations in which the interior spaces of the tires are connected with pressure spaces of a vehicle pneumatic spring system.

Accordingly, it is an object of the present invention to provide a tire pressure control system for vehicles especially motor vehicles which eliminates the disadvantages and shortcomings of the prior art systems.

Another object of the present invention resides in the provision of a tire pressure control system which is fully automatic, operates only at predetermined timed intervals and obviates the attendance on the part of the driver thereby increasing safety of operation, not only because the human error is eliminated but also because the driver no longer is distracted by attending to such control tasks.

A further object of the present invention is the provision of a tire pressure control installation which is simple, normally connects the system leading to the inside of the tire with the atmosphere and is provided with a check valve automatically operated to compensate for leakage losses as soon as the line leading to the inside of the tire is connected with the pressure control system.

A still further object of the present invention is the provision of a control system periodically connecting the inside of the tire with a supply of air under pressure which is so arranged and constructed as to minimize the time during which the places which require seals are subjected to pressure to thereby minimize wear and tear as well as losses at these seals.

Another object of the present invention is the provision of a check valve construction for the tires that is particularly suitable for use with the type of system outlined above.

These and other objects, features and advantages of the present invention will become more obvious from the following description when taken in connection with the accompanying drawing which shows, for purposes of illustration only, one embodiment in accordance with the present invention and wherein FIGURE 1 is a schematic view of ahe overall tire-pressure control installation in accordance with the present invention, FIGURE 2 is a cross sectional view, on an enlarged scale, of the check valve at the tire utilized in the system of FIGURE 1, and FIGURE 3 is a cross-sectional view on an enlarged scale of the control valve utilized in the system of FIGURE 1.

Referring now to the drawing wherein like reference numerals are used throughout the two views thereof to designate corresponding parts, and more particularly to FIGURE 1, reference numeral 10 designates therein a wheel of any known construction which is provided with a pneumatic tire 11 also of any known construction. A line 14 leads from the inside or interior space 12 of the tire 11 through a check valve 13 which will be more fully described hereinafter by reference to FIGURE 2 to the wheel hub 15. The transition between the rotating part of the line 14 and the non-rotating part of the line which consists of sections 17 and 18 takes place at the sealing place generally designated by reference numeral 16. A control member 19 constructed as three-way valve is interposed between the sections 17 and 18. A line 20 leads from the three-way valve 19 into the atmosphere. The three-way valve 19 is actuated by a lever 21 which is pulled in the normal rest position thereof through a draw spring 22 against an abutment 23 and thereby connects the line 17 through line 20 with the atmosphere. The portion of the line in the three-way valve 19 which extends upwardly from the intersection of the line portions extending in the direction of lines 17 and 20 as shown in FIGURE 1 is not used in this position and is effectively closed off by the valve housing.

The lever 21 is connected through a link 24 with an iron plunger or other suitable magnetic core 25 which is pulled into an electro-magnet 26 when the latter is energized by current flowing therethrough. The lever 21, upon energization of winding 26, thereby abuts against an abutment 27 whereby the line sections 17 and 18 are connected with each other. Again, in the position of the lever 21 in which it abuts against the abutment 27, that portion within the three-way valve which would point upwardly in FIGURE 1 would be closed off by the housing.

The circuit for the energization of the electro-magnet 26 includes the conventional vehicle battery 28 and the usual ignition switch 29. An electric line 30 leads to the ignition installation (not illustrated). A line 31 connected in parallel with the ignition line 30, in turn, is split into two parallel lines and more particularly into a line 32 which serves for the energization and actuation of a timing mechanism for an electrically timed switch mechanism 33 and into a line 34 which lead to the rotating contact finger 35 that is periodically set into motion by the timing mechanism 33. The timing mechanism may thereby be of any suitable known construction.. During the period when the finger 35 passes over any one of stationary contacts 36 all of which are connected together, current flows from battery 28 through switch 29 over line 31, contact 35, countercontact 36 through line 37 and thereby energizes the electro-magnet 26.

A compressor 38 driven by the vehicle engine maintains within an air pressure tank 39 a predetermined excess pressure of air. Since such installations including the valving mechanisms therefore are old in the art, a further detailed showing thereof is dispensed with herein. The tank 39 is connected through line 40 with the control valve 41 which, in turn, is in communication with line section 18, on the one hand, and with a line 42, on the other, leading into the atmosphere. Control valve 41 is actuated by swinging the lever 43 either or downward direction. For purposes of effectively controlling the installation, a line 44 branches off from line 18 to thereby feed back the magnitude of the pressure prevailing within the tire when the coil 26 is energized so as to establish an equilibrium condition in the control system as will be explained more fully hereinafter.

The check valve 13 is illustrated in greater detail in FIGURE 2. A stepped piston 45 is provided with a bore 46 and abuts at the inner end thereof against a pin 47 at the opposite end of which is secured a piston like plate 48 with a sealing ring 49 securely connected with the pin 47 and plate 48. A compression spring 50 constantly seeks to displace or force the pin 47 against the stepped piston 45, namely downwardly as viewed in FIGURE 2. The space 51 between the stepped piston 45 and the housing 52 is vented with the atmosphere through a line 53. The pressure prevailing in line 14 acts against the lower face of the stepped piston 45.

FIGURE 3 illustrates in diagram form the interior of the control valve 41 in its neutral, center position. Upward or downward movements of the lever 43 will effect a connection between lines 18 and 40, or between lines 18 and the atmosphere through the throttle opening $a$. The throttling means $a$ are provided in order to avoid a too rapid lowering of the pressure within line 18 while it is being reduced to the lower desired value.

The drawing illustrates the various parts of the system in the normal position with the vehicle standing still in which the tire 11 is under pressure whereas the lines 14 and 17 and also the critical sealing place 16 is pressureless since the three-way valve 19 connects the line 17 with line 20 and thereby with the atmosphere. The tire pressure is maintained because, as may be readily seen from FIGURE 2, the sealing ring 49 abuts against the sealing surface thereof facing the housing and the check valve 13 is closed.

If the vehicle is now set into operation, the ignition switch 29 is closed. As a result thereof, current flows through line 32 and the timing mechanism of the timing switch 33 commences to move the indicator finger 35. From time to time, for example, every ten minutes, the contact finger 35 slides over one of the countercontacts 36. Such contact lasts, for example, ten seconds. During this period of time, the line 37 is energized so that coil 26 is also energized and the core 25 is pulled toward the right as viewed in FIGURE 1, whereby the three-way valve 19 is moved into the position thereof in which the line sections 17 and 18 are connected with each other. A predetermined pressure prevails within line section 18 the magnitude of which varies as will be described more fully hereinafter. As soon as the pressure prevailing in line 18 also prevails in the line sections 17 and 14, the check valve 47–49 is opened and more particularly also in the case when the pressure in lines 17 and 14 is smaller than the pressure within the inside of the tire 12. This is so as the pressure prevailing in line 14 acts on the stepped piston 45 with a relatively large effective surface, namely equal to the cross sectional area of the space 51, whereas the counterpressure from the tire inside 12 is effective only on the relatively small surface of the plate 48. As soon as a predetermined pressure is present within line 14, the stepped piston 45 moves in the upward direction as viewed in FIGURE 2 of the drawing and thereby necessarily forces the check valve 47–49 into the open position thereof. The pressure equalization between the system 18, 17, 14 and the inside 12 of the tire now takes place through bore 46. After approximately ten seconds the electric line 37 as described hereinabove is again deenergized, whereupon the spring 22 pulls the lever into the position thereof illustrated in the drawing and the pressure lines 14 and 17 are again vented. At that moment, the spring 50 again returns the check valve 47–49 against its seat in which it effectively closes the inside 12 of tire 11 against the atmosphere.

The lever 43, for example, may be displaced in dependence on the vehicle load and/or the vehicle speed and the line 18 is thereby connected either with the line 40 which causes a pressure increase in line 18 or with the line 42 which causes a pressure decrease in the line 18. The vehicle load and/or the vehicle speed will be registered at the automatic adjusting device 55, for example, by the pressure of the air springs of the vehicle or the pressure of the pressure-head speedometer. Within line 18, a specific pressure is established which represents the desired valve for each existing load and/or speed factor. The actual value which exists within line 18 is at every instance registered at the device 55 through line 44. If the actual value is lower than the desired value, the device 55 will actuate the linkage to lever 43 by moving it upward, thereby connecting line 18 with line 40 and increasing the pressure within line 18. This increase in pressure within line 18 will be registered at the adjusting device by line 44 and the linkage to lever 43 will be moved downward at the moment the desired value is reached. The control means 41 is thereby returned to its neutral, center position and the line 18 is now closed off and is neither connected to line 40 nor to the atmosphere.

If the actual pressure registered by line 44 is greater than the desired pressure, the adjusting device 55 will move the linkage to lever 43 downward, thereby connecting line 18 with the outside air until the pressure is reduced to the desired value. The linkage to lever 43 will then be moved upwardly, again reaching the neutral, center position, as illustrated by FIGURE 3. Consequently, there always prevails within line 18 also during the normal position of the three-way valve 19 as illustrated in FIGURE 1, the desired pressure desired for the inside 12 of the tire 11. Since the pressure within line 18, which is connected through line 44 with the control mechanism adapted to establish always the desired pressure for the inside of the tire, and since this pressure always has to be greater than atmospheric pressure, there always prevails within line 18 a pressure greater than atmospheric pressure so that the tire inside may possibly be relieved through the check valve 13. Line 18 is never connected within the control valve 41 with the atmosphere through apertures 42 for such length of time that no pressure at all prevails within line 18. Instead, the aperture 42 merely serves for discharging so much air as is necessary to establish the desired pressure reduction within the tire inside. During the periods of time in which the inside 12 of tire 11 is periodically connected with line 18, the control valve 41 has to respond once again.

Any suitable control mechanism may be used to actuate the lever 43 of the control valve 41, for example, as described more fully in the copending application Serial No. 80,452, filed January 3, 1961, entitled "Pressure Regulating System," filed by Friedrich H. Van Winsen and myself as joint inventors, and assigned to the assignee of the present application.

While I have shown and described one embodiment in accordance with the present invention it is understood that the same is not limited thereto but is susceptible of many changes and modifications within the spirit and scope thereof and I, therefore, do not wish to be limited to the details shown and described herein but intend to cover all such changes and modifications as are encompassed by the scope of the appended claims.

I claim:

1. A tire pressure control installation for vehicles, especially motor vehicles provided with a relatively stationary part, comprising rotating wheel means provided with tire means thereon, pressure means at said vehicle effectively providing a source of a pneumatic medium under predetermined pressure, connecting means selectively providing a communication between the inside of said tire means and said pressure means or the atmosphere including control valve means within said connecting means, means for automatically operating said control valve means to effectively connect the inside of said tire means periodically with said pressure means for relatively short periods of time and with said atmosphere during the remaining time including timer-switch means, electrically operated actuating means for actuating said control means, means for operating said timer-switch means during operation of said vehicle and energizing circuit means for said actuating means including contact means selectively and periodically operated by said timer means.

2. A tire pressure control installation for vehicles, especially motor vehicles provided with ignition circuit means adapted to be selectively closed and with a relatively stationary part, comprising rotating wheel means provided with tire means thereon, pressure means at said vehicle effectively providing a source of a pneumatic medium under predetermined pressure, connecting means selectively providing a communication between the inside of said tire means and said pressure means or the atmosphere including control valve means within said connecting means, means for automatically operating said control valve means to periodically connect the inside of said tire means with said pressure means for relatively short periods of time including electrically operated timer-switch means, electrically operated actuating means for actuating said control means, energizing circuit means interconnected in said ignition circuit means for energizing said electrically operated timer means only during operation of said vehicle, and further energizing circuit means interconnected also in said ignition circuit means for energizing said actuating means and provided with normally open contact means selectively operated by said timer means so as to actuate said control means automatically for relatively short periods of time to establish the communication between the inside of said tire means and said pressure means.

3. A tire pressure control installation for vehicles, especially motor vehicles provided with a relatively stationary part, comprising rotating wheel means provided with tire means thereon, pressure means at said vehicle effectively providing a source of a pneumatic medium under predetermined pressure, connecting means selectively providing a communication between the inside of said tire means and said pressure means or the atmosphere including control valve means within said connecting means and check valve means within the section of said connecting means at said rotating wheel means, means for automatically operating said control means to automatically connect the inside of said tire means periodically with said pressure means for relatively short periods of time including electrically operated timer-switch means, electrically operated actuating means for actuating said control means, energizing circuit means for energizing said electrically operated timer means during operation of said vehicle, and further energizing circuit means for said actuating means and provided with contact means selectively and periodically operated by said timer means, said check valve means including differential piston means to effect opening thereof with a pressure of the pneumatic medium which is less than the pressure within said tire means.

4. A tire pressure control installation for vehicles, especially motor vehicles provided with a relatively stationary part, comprising rotating wheel means provided with tire means thereon, pressure means at said vehicle effectively providing a source of a pneumatic medium under predetermined pressure, connecting means selectively providing a communication between the inside of said tire means and said pressure means or the atmosphere including control means within said connecting means, said control means including control valve means and means for varying the pressure of said pneumatic medium at said control valve means in dependence on the vehicle load and vehicle speed, means for automatically operating said control valve means during operation of said vehicle to automatically connect the inside of said tire means periodically with said pressure means for relatively short periods of time including timer-switch means, electrically operated actuating means for actuating said control valve means, means for operating said timer-switch means during operation of said vehicle, and energizing circuit means for said actuating means including contact means selectively and periodically operated by said timer means during operation of said vehicle.

5. A tire pressure control installation for vehicles, as defined in claim 4, wherein said means for operating said timer-switch means during operation of said vehicle includes means operatively connecting said timer-switch means with said rotating wheel means.

6. A tire pressure control installation for vehicles as defined in claim 4, wherein said means for varying the pressure of said pneumatic medium in dependence on the vehicle load and vehicle speed includes a further control valve means arranged within said connecting means between said pressure means and said first-mentioned control valve means, and means for automatically operating said further control valve means to automatically connect said first-mentioned control valve means with said pressure means or with the atmosphere and provide effectively an increase in tire pressure with an increase in either vehicle speed or vehicle load and vice versa.

7. A tire pressure control installation for vehicles, especially motor vehicles provided with ignition circuit means adapted to be selectively closed and with a relatively stationary part, comprising rotating wheel means provided with tire means thereon, pressure means at said vehicle effectively providing a source of a pneumatic medium under predetermined pressure, connecting means selectively providing a communication between the inside of said tire means and said pressure means or the atmosphere including control means within said connecting means, said control means including control valve means and means for varying the pressure of said pneumatic medium in dependence on the vehicle load and vehicle speed, means for automatically operating said valve means to automatically connect the inside of said tire means periodically with said pressure means for relatively short periods of time and with the atmosphere during the remaining time including electrically operated timer-switch means, electrically operated actuating means for actuating said control valve means, energizing circuit means interconnected in said ignition circuit means for energizing said electrically operated timer means during operation of said vehicle, and further energizing circuit means interconnected also in said ignition circuit means for energizing said actuating means including normally open contact means selectively and periodically operated by said timer-switch means for actuating said control valve means for relatively short periods of time to establish said communication between the inside of said tire means and said pressure means.

8. A tire pressure control installation for vehicles, especially motor vehicles provided with ignition circuit means adapted to be selectively closed and with a relatively stationary part, comprising rotating wheel means provided with tire means thereon, pressure means at said vehicle effectively providing a source of a pneumatic medium under predetermined pressure, connecting means selectively providing a communication between the inside of said tire means and said pressure means or the atmosphere including control means within said connecting means and check valve means within the section of said connecting means at said rotating wheel means, said control means including control valve means and means for varying the pressure of said pneumatic medium in dependence on the vehicle load and vehicle speed, means for automatically and periodically actuating said central valve means during operation of the vehicle to automatically and periodically connect the inside of said tire means with said pressure means for relatively short periods of time and with the atmosphere during the remaining time including electrically operated timer-switch means, electrically operated actuating means for actuating said control valve means, energizing circuit means interconnected in said ignition circuit means for energizing said electrically operated timer-switch means during operation of the vehicle, and further energizing circuit means interconnected also in said ignition circuit means for said actuating means including normally open contact means selectively and periodically operated by said timer means so as to actuate said control means for relatively short periods of time and establish said communication between the inside of said tire means and said pressure means, said check valve means including differential piston means to effect opening thereof with a pressure of the pneumatic medium which is less than the pressure within said tire means.

9. A tire pressure control installation for vehicles as defined in claim 8, wherein said means for varying the pressure of said pneumatic medium includes a further control valve means arranged within said connecting means between said pressure means and the first-mentioned control valve means, and means for automatically actuating said further control valve means to automatically connect said first-mentioned control valve means with said pressure means or with the atmosphere including means responsive to at least one of the two variable magnitudes consisting of vehicle speed and vehicle load to provide effectively an increase in tire pressure with an increase in either vehicle speed or vehicle load and vice versa.

10. A tire-pressure control installation for vehicles, especially motor vehicles provided with a relatively stationary part and at least one rotating wheel means, comprising said rotating wheel means provided with tire means thereon, pressure means at said vehicle effectively providing a source of pneumatic medium under predetermined pressure, connecting means selectively providing a communication between the inside of said tire means and said pressure means or the atmosphere including control valve means within said connecting means, means for automatically operating said control valve means to periodically connect to the inside of said tire means with said pressure means for relatively short periods of time including timer-switch means, electrically operated actuating means for actuating said control means, means for operating said timer-switch means only during operation of said vehicle including means operatively connecting said timer-switch means with said wheel means, and energizing circuit means for energizing said actuating means including normally open contact means selectively and periodically actuated by said timer-switch means so as to actuate said control valve means automatically for relatively short periods of time to establish the communication between the inside of said tire means and said pressure means.

References Cited in the file of this patent

UNITED STATES PATENTS

| | | |
|---|---|---|
| 1,827,662 | Maas | Oct. 13, 1931 |
| 1,988,671 | Stout | Jan. 22, 1935 |
| 2,452,527 | Peter | Oct. 26, 1948 |
| 2,473,683 | Hines | June 21, 1949 |
| 2,976,906 | Kamm et al. | Mar. 28, 1961 |